(12) United States Patent
Huang et al.

(10) Patent No.: US 8,173,322 B2
(45) Date of Patent: May 8, 2012

(54) TUBULAR SOLID OXIDE FUEL CELLS WITH POROUS METAL SUPPORTS AND CERAMIC INTERCONNECTIONS

(75) Inventors: Kevin Huang, Export, PA (US); Roswell J. Ruka, Pittsburgh, PA (US)

(73) Assignee: Siemens Energy, Inc., Orlando, FL (US)

( * ) Notice: Subject to any disclaimer, the term of this patent is extended or adjusted under 35 U.S.C. 154(b) by 387 days.

(21) Appl. No.: 12/490,512

(22) Filed: Jun. 24, 2009

(65) Prior Publication Data
US 2010/0330450 A1  Dec. 30, 2010

(51) Int. Cl.
*H01M 8/12* (2006.01)
(52) U.S. Cl. .......................... 429/466; 429/495
(58) Field of Classification Search .................. 429/466, 429/495
See application file for complete search history.

(56) References Cited

U.S. PATENT DOCUMENTS

| | | |
|---|---|---|
| 4,395,468 A | 7/1983 | Isenberg |
| 4,476,198 A | 10/1984 | Ackerman et al. |
| 4,490,444 A | 12/1984 | Isenberg |
| 4,547,437 A | 10/1985 | Isenberg et al. |
| 4,562,124 A | 12/1985 | Ruka |
| 4,596,750 A | 6/1986 | Ruka et al. |
| 4,598,028 A | 7/1986 | Rossing et al. |
| 4,728,584 A | 3/1988 | Isenberg |
| 4,874,678 A | 10/1989 | Reichner |
| 5,200,279 A | 4/1993 | Draper et al. |
| 5,389,456 A | 2/1995 | Singh et al. |
| 5,391,440 A | 2/1995 | Kuo et al. |
| 5,516,597 A | 5/1996 | Singh et al. |
| 5,916,700 A | 6/1999 | Ruka et al. |
| 6,248,468 B1 * | 6/2001 | Ruka et al. ................... 429/488 |
| 7,232,626 B2 | 6/2007 | Jacobson et al. |
| 2002/0139681 A1 | 10/2002 | Long |
| 2005/0058883 A1 | 3/2005 | Ruka et al. |
| 2006/0051643 A1 | 3/2006 | Sarkar et al. |
| 2007/0087254 A1 | 4/2007 | Iyengar et al. |
| 2008/0003478 A1 | 1/2008 | Greiner et al. |
| 2008/0254335 A1 | 10/2008 | Torgerson et al. |

FOREIGN PATENT DOCUMENTS

| | | |
|---|---|---|
| EP | 1376727 A2 | 1/2004 |
| JP | 2002289249 A * | 10/2002 |
| JP | 2009037874 A * | 2/2009 |
| WO | WO02/37589 A2 | 5/2002 |
| WO | WO 2007120545 A2 * | 10/2007 |

OTHER PUBLICATIONS

Nguyen Q. Minh, "Ceramic Fuel Cells", Journal of the American Ceramic Society, vol. 76, No. 3, pp. 563-588.

* cited by examiner

*Primary Examiner* — Gregg Cantelmo

(57) ABSTRACT

An intermediate temperature solid oxide fuel cell structure capable of operating at from 600° C. to 800° C. having a very thin porous hollow elongated metallic support tube having a thickness from 0.10 mm to 1.0 mm, preferably 0.10 mm to 0.35 mm, a porosity of from 25 vol. % to 50 vol. % and a tensile strength from 700 GPa to 900 GPa, which metallic tube supports a reduced thickness air electrode having a thickness from 0.010 mm to 0.2 mm, a solid oxide electrolyte, a cermet fuel electrode, a ceramic interconnection and an electrically conductive cell to cell contact layer.

6 Claims, 6 Drawing Sheets

TUBULAR SOLID OXIDE FUEL CELLS WITH POROUS METAL SUPPORTS AND CERAMIC INTERCONNECTIONS

GOVERNMENT CONTRACT

The Government of the United States of America has rights in this invention pursuant to Contract No. DE-FC26-05NT42613, awarded by the U.S. Department of Energy.

BACKGROUND OF THE INVENTION

1. Field of the Invention

This invention relates to hollow, elongated tubular solid oxide fuel cells, including cylindrical and Delta/triangular types, that can operate between 600° C. to 800° C., and supporting substrates that have a thin, cost effective, mechanically strong, and porous metal structure.

2. Description of the Prior Art

High temperature solid oxide ceramic electrolyte fuel cell ("SOFC") electrochemical generator devices, which operate at about 1,000° C., are disclosed, for example, in Isenberg, U.S. Pat. No. 4,395,468 and Isenberg, U.S. Pat. No. 4,490,444. Such electrochemical generator devices comprise a plurality of elongated, typically annular, fuel cells which convert chemical energy into direct-current electrical energy. The fuel cells can be interconnected in series to provide a desired voltage and/or in parallel to provide a desired current capacity.

Each fuel cell typically includes an optional porous support tube of calcia stabilized zirconia. A porous annular air electrode or cathode generally surrounds the outer periphery of the support tube. The air electrode can be made with doped oxides of the perovskite family, such as, for example, lanthanum manganite) $LaMnO_3$. A dense layer of gas-tight solid electrolyte, typically yttria stabilized zirconia ($ZrO_2$), substantially surrounds the outer periphery of the air electrode. A porous fuel electrode or anode, typically of nickel-zirconia cermet or cobalt-zirconia cermet, substantially surrounds the outer periphery of the solid electrolyte. Both the solid electrolyte and the outer electrode, or, in this case the fuel electrode, are discontinuous to allow for inclusion of an electrically conductive interconnection material providing means to connect adjacent fuel cells. A selected segment of the air electrode is covered by the interconnection material. The interconnection material may comprise a doped lanthanum chromite ($LaCrO_3$) film. The generally used dopant is Mg, although other dopants such as Ca and Sr have been suggested. The dopant serves to enhance the conductivity of the lanthanum chromite p-type conductor.

In this regard, referring to FIG. 1, a prior art tubular, electrochemical cell 10 is shown. The preferred configuration is based upon a high temperature solid oxide electrolyte fuel cell system, operating at about 1,000° C., wherein a flowing gaseous fuel, such as hydrogen, carbon monoxide or unreformed hydrocarbon gases, is directed over the outside of the cell, axially in the embodiment of FIG. 1 in the direction shown by fuel arrow 12. An oxidant, such as air or $O_2$, is directed through the inside of the cell, as shown by oxidant arrow 14. Oxygen molecules pass through porous, thick ceramic support 22 and thick, porous electrically conductive air electrode structure 16 and are converted to oxygen ions which pass through a solid oxide ceramic electrolyte 18 at 1,000° C., to combine with the fuel at a fuel electrode 20. A discontinuous section of ceramic interconnection is shown as 26.

More recently, the calcia stabilized zirconia support has been eliminated by use of self-supporting air electrodes, as illustrated in U.S. Pat. No. 5,916,700 (Ruka et al.), having a thickness of 1.0 mm to 3.0 mm, made of doped, sintered lanthanum manganite, and the covering electrolyte is taught to be about 0.001 mm to 0.1 mm thick. These fuel cells operate at 1,000° C. with a gaseous fuel such as $H_2$, CO or natural gas, and operation at that temperature excluded use of metal, or metal alloys.

The use of self-supporting, ceramic air electrodes was brought about because the ceramic calcia stabilized zirconia support structures added 1.0 mm to 2.0 mm thickness to the structure, required up to 14 hours sintering at 1,650° C. and were a compromise between mechanical strength and $O_2$ gas diffusion. To allow thinner ceramic support structures, Rossing et al. (U.S. Pat. No. 4,598,028) added 3 wt. % to 45 wt. % thermally stable oxide fibers to the ceramic powder to provide an interlocked fiber/powder structure. The resulting thickness was from 0.5 mm to 2.0 mm, and the separate support still operated in fuel cells operating at 1,000° C. The use of fibers in the separate ceramic support, however, while possibly reducing ceramic support structures by about 0.5 mm, required additional steps and added cost.

Other tubular, elongated, hollow fuel cell structures are described by Isenberg, in U.S. Pat. No. 4,728,584—"corrugated design" and by Greiner et al.—"triangular", "quadrilateral", "oval", "stepped triangle" and a "meander"; all herein considered as hollow elongated tubes. A hollow elongated tubular geometry of particular interest has the geometric form of a number of integrally connected elements of triangular or "delta" like cross section, see FIG. 3 of the drawings. These triangular, elongated, hollow cells have been referred to in some instances as Delta X cells where Delta is derived from the triangular shape of the elements and X is the number of elements. These type cells are described for example in basic, Argonne Labs U.S. Pat. No. 4,476,198; and also in U.S. Pat. No. 4,874,678; U.S. Patent Application Publication 2008/0003478 A1, and International Publication No. WO 02/37589 A2 (Ackerman et al., Reichner; Greiner et al., and Thomas et al., respectively).

Generally, in newer triangular, tubular, elongated, hollow cross-section, so called Delta X cells, the resulting overall cross section has a flat face on the interconnection side and a multi-faceted triangular face on the anode side. Air flows within the internal discrete passages of triangular shapes where, at the end of the cell, the air can reverse flow to diffuse through the air electrode if air feed tubes are used. A basic encyclopedic publication by N. Q. Minh, in "Ceramic Fuel Cells", *J. Am. Ceramic Soc.*, 76 [3] 563-588, 1993 describes in detail a variety of fuel cell designs, including the tubular and triangular and other types, as well as materials used and accompanying electrochemical reactions.

Nguyen Q. Minh also describes seal-less, tubular SOFCs, which operate at about 1,000° C. so that the solid oxide electrolyte is effective, describes SOFC supports as of 1993. Those separate SOFC supports were extruded CaO stabilized zirconia of 35% porosity, having a 1.0 mm to 1.5 mm thickness and a 36 cm to 1 meter length overlaid with a 35% porous 1.4 mm thick strontium doped $LaMnO_3$ air electrode and a 40 micrometer (0.04 mm) thick gas tight $Y_2O_3$ stabilized $ZrO_2$ electrolyte.

In another type fuel cell design, Jacobson et al. (U.S. Pat. No. 7,232,626) teaches two main SOFC's; tubular and planar, dramatically different, each having advantages and disadvantages. Jacobson et al. recognized the fact that exotic powders such as 99% pure zirconia etc. cost $30 to $60/lb. while, for example, stainless steel costs $2/lb., so that support and interconnection plates of metal sheet, sintered powder or wire mesh of 0.5 mm to 0.75 mm (500 micrometer to 750 micrometer) could provide reduced manufacturing costs. One of the major disadvantages of the Jacobson et al. SOFC design, however, includes poor bonding strength caused by the formation of oxide scale on the surface of metal substrates, which leads to a high contact resistance and performance degradation during operation.

The cost of ceramic air electrode supported, seal-less, tubular SOFCs is the major hurdle to commercialization. Whether the cost can be lowered to the level comparable to the existing power generation technology and acceptable for market entry determines critically, the success of the SOFC technology. Therefore, cost reduction in any area or component is a critical path for the current product development, especially if cost reduction in one component leads to further cost reduction in other components as a consequence.

High product cost is associated with the high operating temperature of a SOFC. If a SOFC operates at high temperatures, about 1,000° C., then: 1) the cell and module materials used are limited to the expensive high-purity and high-strength category; 2) the cell design has to adopt one-end closed tubular geometry for the consideration of effective internal heat exchange. Although use of ceramic air feed tubes to deliver the needed air and recuperate the heat given off from the stack avoids using expensive exotic external heat exchangers, the high-purity $Al_2O_3$ air feed tubes are very costly; 3) the thermal management of the stack temperature requires a convoluted airflow to achieve a uniform temperature distribution, not to mention that it takes much longer time to startup and shutdown; 4) a pre-reformer separate from the stack is needed to reform incoming hydrocarbon fuels into simple fuels; and 4) the stack electrical efficiency is compromised by a lowered intrinsic thermodynamic efficiency and higher fuel losses at high temperatures.

In contrast, "intermediate-temperature" SOFCs, about 600° C. to 800° C., avoid every drawback aforementioned for "high temperature"—1,000° C.—SOFCs. In addition, the electrical efficiency is particularly boosted by the intrinsic thermodynamic fuel conversion efficiency, lower mixed-conduction related fuel loss and current collector related power loss that is critically important for low-voltage and high-current power generation.

What is needed is a new design of low-cost SOFC for applications at low or intermediate temperatures, where air electrode thickness and thus ceramic materials costs are reduced, yet where a strong porous support of some sort will still be present.

It is an object of this invention to provide a low cost intermediate operational SOFC having a very porous but also a very strong and very thin support on which other functional layers, that are in general costly, can exist in the SOFC in the form of very thin films.

It is another object of this invention to provide a strongly bonded and low contact resistance ceramic layer that enables single SOFCs to be combined into SOFC bundles (plurality of SOFC's), and to operate as open-end 'once-through' fuel cells.

SUMMARY OF THE INVENTION

The above problems have been solved and the above need met by providing an intermediate temperature, solid oxide fuel cell structure, operating at 600° C. to 800° C. comprising: (1) a thin, porous, hollow, elongated porous metal support tube having a tensile strength of from 700 GPa to 900 GPa (where 1 GPa=$10^9$ Pascals, and where 6,890 Pascals, Pa=1 psi—pounds/sq. in.), and a thickness of from 0.10 mm to 1.0 mm, preferably from 0.10 mm to 0.35 mm and having a porosity of from 25 vol. % to 50 vol. %, which support is selected from the group of sintered mixtures of iron, chromium and manganese with optional amounts of materials selected from the group consisting of nickel, titanium, cerium, yttrium, lanthanum and zirconium, and mixtures thereof; (2) a ceramic air electrode having a porosity of from 20 vol. % to 30 vol. % capable of reducing oxygen molecules into oxygen ions at 600° C. to 800° C., and having a reduced thickness of 0.010 mm to 0.20 mm, preferably, now allowable to 0.010 to 0.050 mm; (3) a ceramic solid oxide electrolyte capable of conducting oxygen ions at 600° C. to 800° C., and having a thickness of 0.001 mm to 0.01 mm; (4) a cermet (ceramic-metal) fuel electrode; and (5) ceramic interconnections, for cell-to-cell connection, having thickness of 0.01 mm to 0.1 mm. In many instances, in the past, manufacturing issues have limited film thicknesses in this SOFC area, and thicker materials were needed to ensure tensile strength problems.

The preferred metals for the SOFC metal support are selected from the group of ferritic stainless steels and mixtures thereof, most preferably of iron, chromium, manganese, nickel, titanium, cerium, yttrium, lanthanum and zirconium.

The thin, porous metal support has a coefficient of thermal expansion reasonably matched to other cell components at operation below 800° C. and its structured strength in terms of tensile strength described above is about 100× (times) stronger than the structural strength of previous ceramic supports, so its thickness can be reduced by at least a factor of five to ten. This provides a very minimalist metal support that allows each of deposition of subsequent layers, adds essentially no material or production cost and drives dramatic cost savings due to very substantial reduction of the amount of costly air electrode and electrolyte ceramic required.

The porous metal support also has an electronic conductivity of about 3,000 S/cm (units) to 6,000 S/cm (units) which is about 50-100 times higher than pervious ceramic air-electrode substrates at operating temperatures below 800° C. (where S equals a Siemens unit). Such a conducting substrate provides a pool/mass of electrons required for oxygen reduction reactions occurring at the contacting air electrode (cathode). Very importantly, the cathode layer (air electrode) is no longer needed to be very conducting and very thick, which in turn offers more options for materials selection and cost reduction.

The dense ceramic interconnection layer, used in this invention, not only prevents oxygen molecules leaking through the porous metal substrate but also avoids a thermally growing oxide scale typically occurring at the surface of a metal surface when it is exposed to both oxidizing and reducing atmospheres. The latter is extremely important in terms of maintaining low contact resistance between cells when individual single SOFCs are connected into bundles and then into an array of bundles in a SOFC stack.

Combination of low-cost high-strength porous metal supported SOFCs with dense ceramic interconnections operating at low temperatures, enables use, besides traditional closed end SOFC module design, of a more exotic but now commercial, 'once-through' SOFC stack module design, such once-through designs are described in U.S. Pat. No. 5,200,279 and U.S. Patent Publication No. U.S. 2007/0087254A1 (Draper et al. and Iyengar et al.). A high-cost closed-end manufacturing process is no longer needed. Gas seals in the new designs of this invention can be easily achieved by mechanical seals/ fittings made from high temperature oxidation resistant metals such as stainless steels and Inconel metal materials such as Swagelok® seals and Conax® seals. That is, there are now seals/fittings that can be used at the now much lower temperatures of 600° C. to 800° C. than at the previous operating temperatures of 1,000° C. in the stack.

'Once-through', low temperature porous metal supported SOFC stack modules may make direct utilization of hydrocarbon fuels inside the stack possible. The on-cell reformation will eliminate the need for pre-reformer and significantly reduce the cost of the overall SOFC system. The 'once-through' low-temperature porous metal supported SOFC stack modules allows the use of low-cost, low-temperature, commercially available heat exchangers. These 'once-through' low-temperature porous metal supported SOFC stack modules, shown in FIGS. 4A-4C, easily separate air and fuel streams. Such a feature becomes vitally important in application of zero emission power plants where air and fuel streams are required to be separated, so that $CO_2$ in the fuel stream can be efficiently captured and sequestered.

The 'once-through' low-temperature porous metal supported SOFC stack modules offer more options to manage the temperature distributions in the stack by independently controlling air and fuel flows and the directions of the flows.

BRIEF DESCRIPTION OF THE DRAWINGS

There are shown in the drawing certain exemplary embodiments of the invention as presently preferred. It should be understood that the invention is not limited to the embodiments disclosed in the examples and is capable of variations within the scope of the appended claims. In the drawings:

DESCRIPTION OF THE PREFERRED EMBODIMENTS

Figure 2:
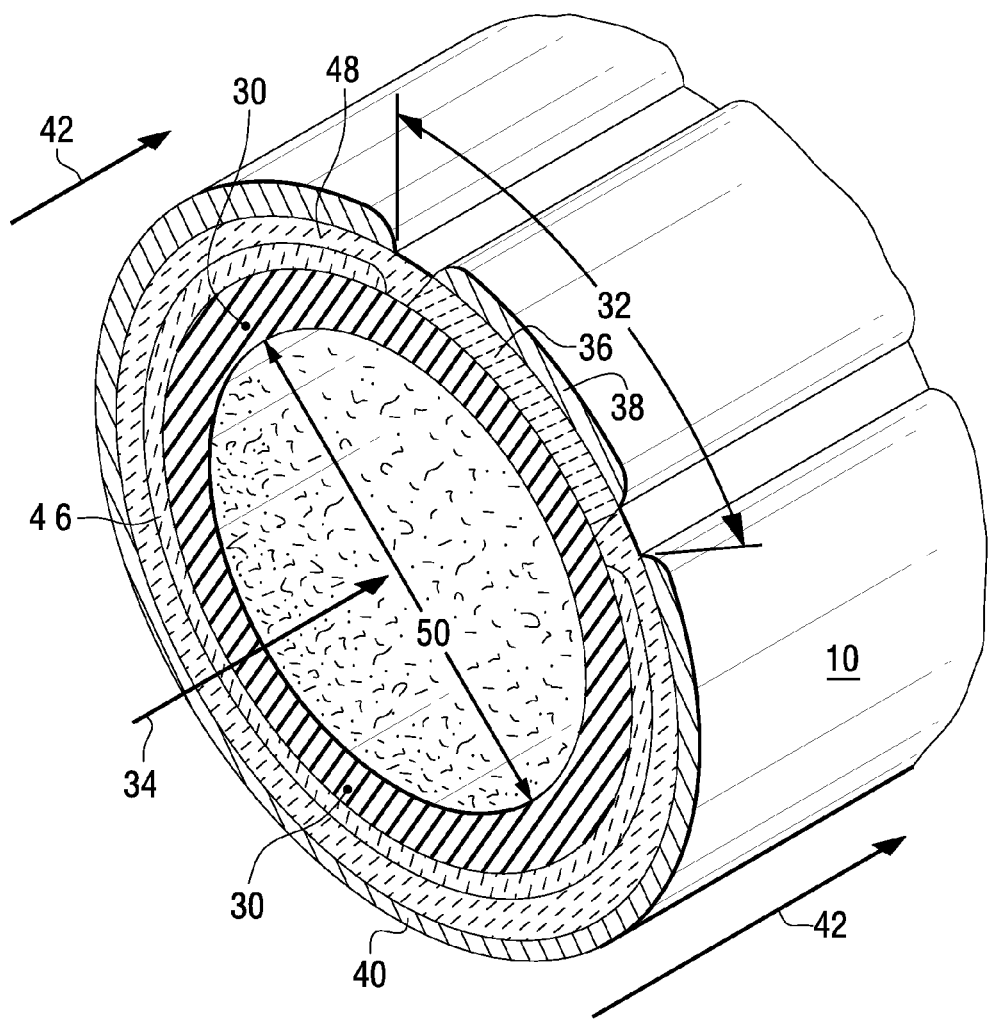
FIG. 2 is a schematic sectional view of the fuel cell of the invention, and is the best description of the invention, showing a very thin porous metal support which holds a very thin ceramic air electrode and electrolyte; where fuel electrode and an interconnection and contact layer are also shown. Thinner substrate and functional layers would not only reduce the resistance to oxygen and fuel transports, but also reduce the material costs.

Referring now to FIG. 2, the preferred configuration of this invention is based upon a solid oxide fuel cell system wherein a flowing gaseous fuel, such as hydrogen, carbon monoxide or unreformed hydrocarbon gases, is directed over the outside of the cell, axially in the embodiment of FIG. 2 in the direction shown by fuel arrow 42. An oxidant, such as air or $O_2$, is directed through the inside of the cell, as shown by oxidant arrow 34. Oxygen molecules pass through porous, very thin 0.1 mm to 1.0 mm, preferably 0.10 mm to 0.35 mm metal support tube 30 and thin, porous electrically conductive ceramic air electrode structure 46, which is 0.010 mm-0.2 mm, preferably 0.010 mm to 0.050 mm thick; and are converted to oxygen ions which pass through solid oxide ceramic electrolyte 48, which is 0.001 mm-0.01 mm thick, to combine with the fuel at a fuel electrode 40. Thus, many component layers in this invention are very thin layers, down to micro films. As applied to fuel cells, for example, the term "air electrode" as used herein refers to the electrode which will be in contact with an oxidant, and "fuel electrode" refers to the electrode that will be in contact with the fuel.

The electrochemical cell 10 includes very strong, porous metal support tube 30 having a tensile strength of from 700 GPa to 900 GPa. This support tube preferably comprises ferritic stainless steels (Fe, Cr, Mn) forming a 25 vol. % to 50 vol. % porous structure 30. The air electrode or cathode 46 is a mixture of porous, composite metal oxides to provide a structure preferably approximately 10 micrometers to 50 micrometers (0.010 millimeter to 0.050 millimeters) thick. This is substantially below the normal 1.0 to 3.0 mm thick self-supporting air electrodes currently in use, a 60× saving just for high purity air electrode material alone. The air electrode can be deposited on the support tube by well known slurry dip, ink roller coating and sintering techniques, etc. The air electrode comprises two phases, one phase being electronic conducting mixed oxides, for example, doped oxides or mixtures of oxides of the perovskite family, such as $LaMnO_3$, $CaMnO_3$, $LaNiO_3$, $LaCoO_3$, $LaCrO_3$, and the like, one phase being oxide-ion conducting solid electrolyte materials such as doped zirconias. Preferred dopants for pervoskites include Sr, Ca, Co, Ni, Fe, Sn, Ba, Ce and the like. Preferred dopants for electrolytes include Ca, Y, Sc and the like.

A layer of dense, gas-tight solid electrolyte 48 surrounds most of the outer periphery of the air electrode 46. The electrolyte comprises, for example, yttria stabilized zirconia about 1 micrometer to about 10 micrometers thick (0.001 millimeter to 0.01 millimeter). The electrolyte can be deposited on the air electrode by well known thermal atmospheric plasma spray technique. In the case where the electrolyte is to be deposited before the interconnection material, a selected radial segment or portion 32 of the porous metal tube 30 is masked during electrolyte deposition to make the electrolyte discontinuous for inclusion of a layer of non-porous, gas-tight, electrically conductive interconnection material 36 made according to the method of the invention which is deposited on this segment or portion 32. If the interconnection material is to be deposited first, then the electrolyte portion of the porous metal tube 30 is masked initially.

The dense interconnection material 36, which preferably extends the active axial length of each elongated cell 10 as shown, must be electrically conductive in both an oxidant environment and a fuel environment. The term "electrically conductive" as used herein means conducting electrons but not substantially conducting ions. The gas-tight interconnection 36 can be approximately 10 micrometers to about 100 micrometers (0.01 millimeter to 0.1 millimeter) thick. The interconnection should be non-porous, namely over about 95% dense and preferably 99% dense. The interconnection material is highly electrically conductive at temperatures of about 700° C., the usual operating temperature of this porous metal supported intermediate temperature solid oxide fuel cell. The interconnection is preferably dense enough to be substantially leak proof and advantageously has a coefficient of thermal expansion close to that of the solid electrolyte and the porous metal substrate onto which it is deposited, and the other components, including the air electrode. A preferred interconnection material is a ceramic, such as doped lanthanum chromite ($LaCrO_3$). The preferred dopants include Ca, Sr, Y and Ba.

A fuel electrode or anode 40 substantially surrounds the solid electrolyte 48. The fuel electrode or anode 40 is porous, and can comprise, for example, nickel or copper-zirconia cermet. As shown, the fuel electrode 40 also is circumferentially discontinuous, being spaced from the interconnection 36 by a distance sufficient to avoid direct electrical communication between the fuel electrode 40 and both the interconnection 36 and the air electrode 46. The fuel electrode is approximately 100 micrometers (0.1 millimeter) thick. The fuel electrode can be deposited on the electrolyte, for example, by well known thermal atmospheric plasma spray techniques, where nickel graphite particles are thoroughly mixed with solid electrolyte material 48 in a predetermined ratio and the mixture is fed into the gun of an atmospheric plasma spray system by a feeder.

Figure 1:
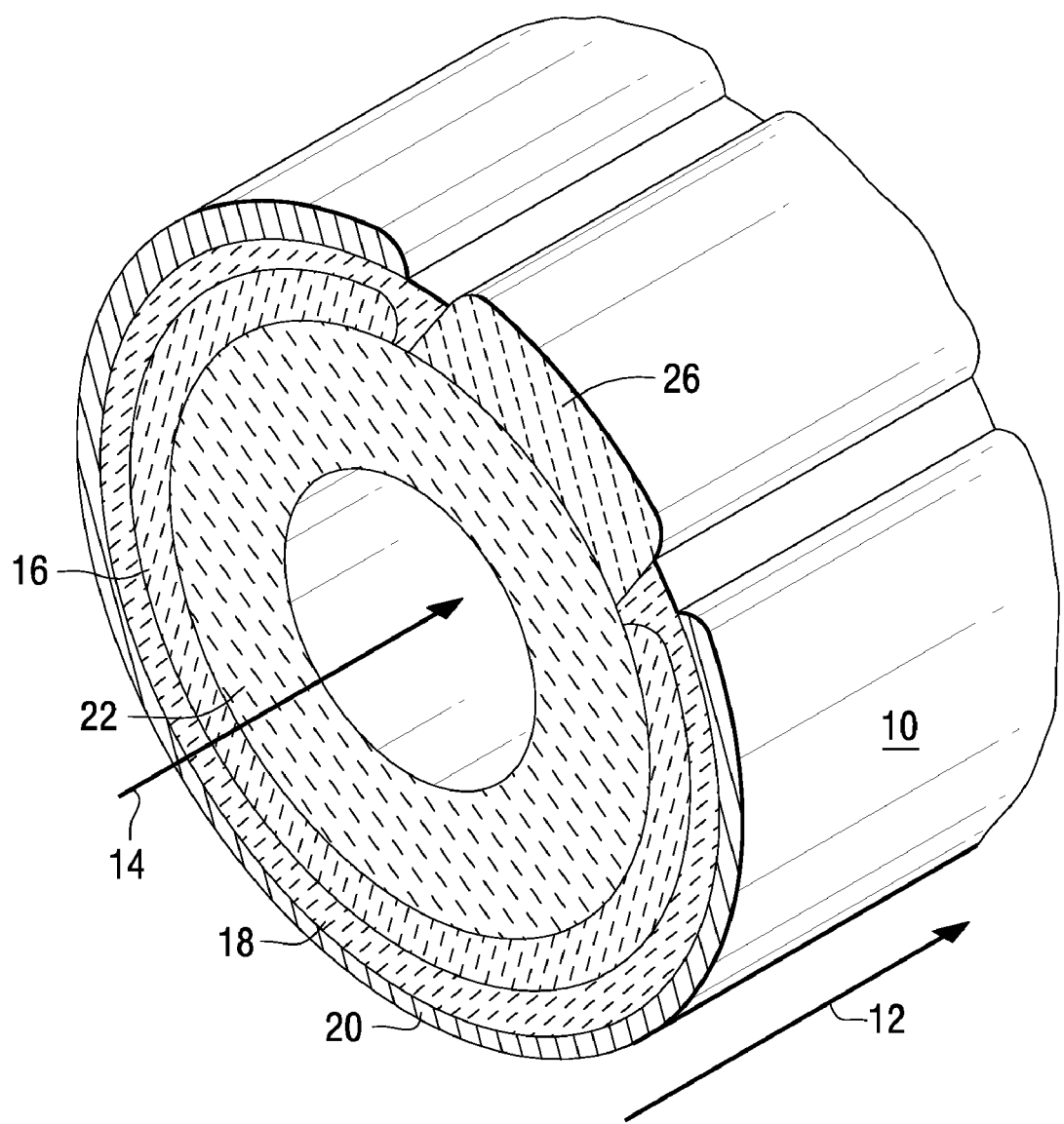
FIG. 1 is a schematic sectional view of a prior art SOFC, showing a very thick ceramic support structure, 22, for supporting a fairly thick air electrode, and electrolyte layers.

Usually, an electrically conductive cell to cell top contact layer 38 is deposited over the interconnection layer 36. This top layer is preferably comprised of an electroplated thin nickel film, and is approximately 1-10 micrometers (0.001 mm to 0.01 mm). Diameter 50 is substantially wider than the support diameter in FIG. 1, allowing more oxidant volume.

Figure 3:
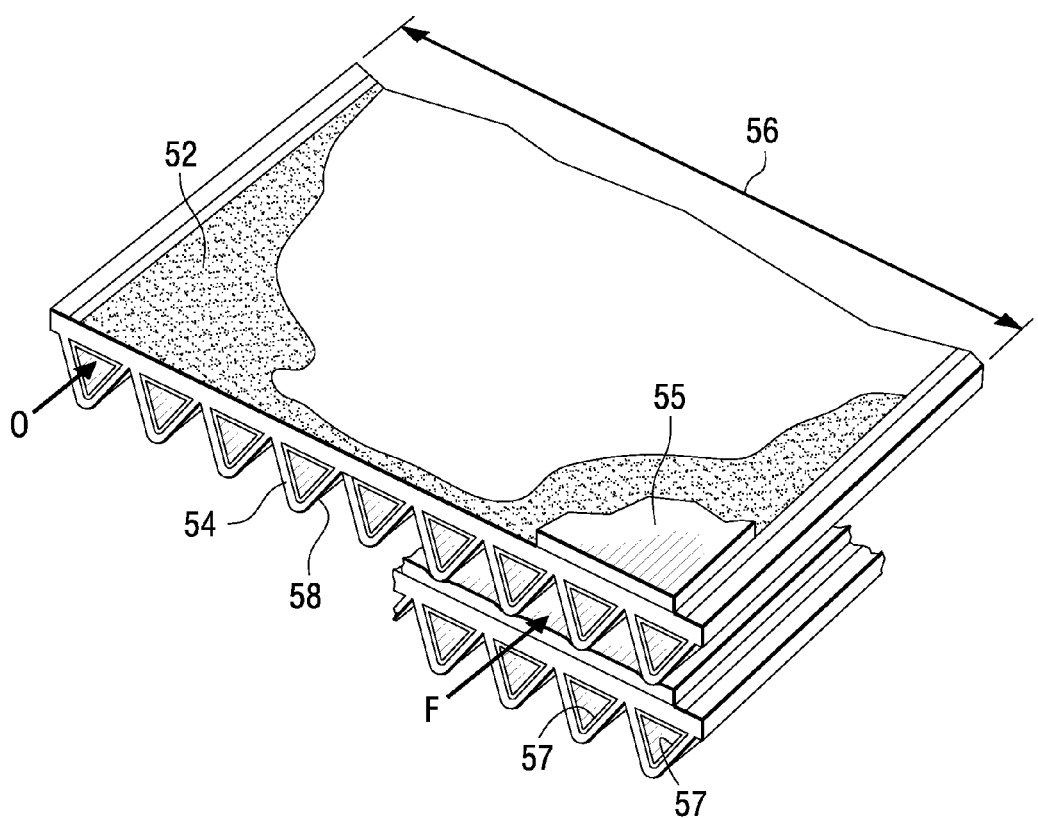
FIG. 3 illustrates a Delta/triangular SOFC utilizing interior metallic supports.

Referring now to FIG. 3, a very high power density solid oxide fuel cell stack is shown. The hollow elongated tubular fuel cells here are triangular solid oxide fuel cells. Here, the air electrode and other components (electrolyte, fuel electrode) generally shown as 54 have the geometric foam of a number of integrally connected elements of triangular cross section. The air electrode can be made of lanthanum manganite. The resulting overall cross section has a flat face on one side and a multi-faceted face on the other side. Air or $O_2$, shown as O, flows within the discrete channels of triangular shape as shown. An interconnection 52 generally of lanthanum chromite covers the flat face. A solid electrolyte covers the multifaceted face and overlaps the edges of the interconnection 52 but leaves most of the interconnection exposed. The fuel electrode 58 covers the reverse side from the flat face and covers most of the electrolyte but leaves a narrow margin of electrolyte between the interconnection and the fuel electrode. The fuel electrode is comprised of, for example, a mixture of nickel and yttria stabilized zirconia.

Series electrical connection between cells is accomplished by means of an electrically conductive top layer 55 of flat nickel felt or nickel foam combination pads, one face of which is sintered to the interconnection while the other face is sintered to the apexes of the triangular multifaceted fuel electrode face of the adjacent cell. An example of a dimension is width 56—about 150 mm. This triangular cell design is active throughout the entire length spanning the interconnection. Thin metallic support is shown as 57. As in the cylindrical fuel cell described in FIG. 2, the metallic support 57, in FIG. 3, will be from 0.10 mm to 1.0 mm thick, preferably from 0.10 mm to 0.35 mm, and have the same porosity and tensile strength, while the air electrode thickness can be reduced preferably to 0.010 mm to 0.050 mm, and is made of the same materials described above for the cylindrical fuel cell, as it the same for the electrolyte and fuel electrode. Fuel F passes as shown through the cells contacting fuel electrode 58.

Figure 4A:
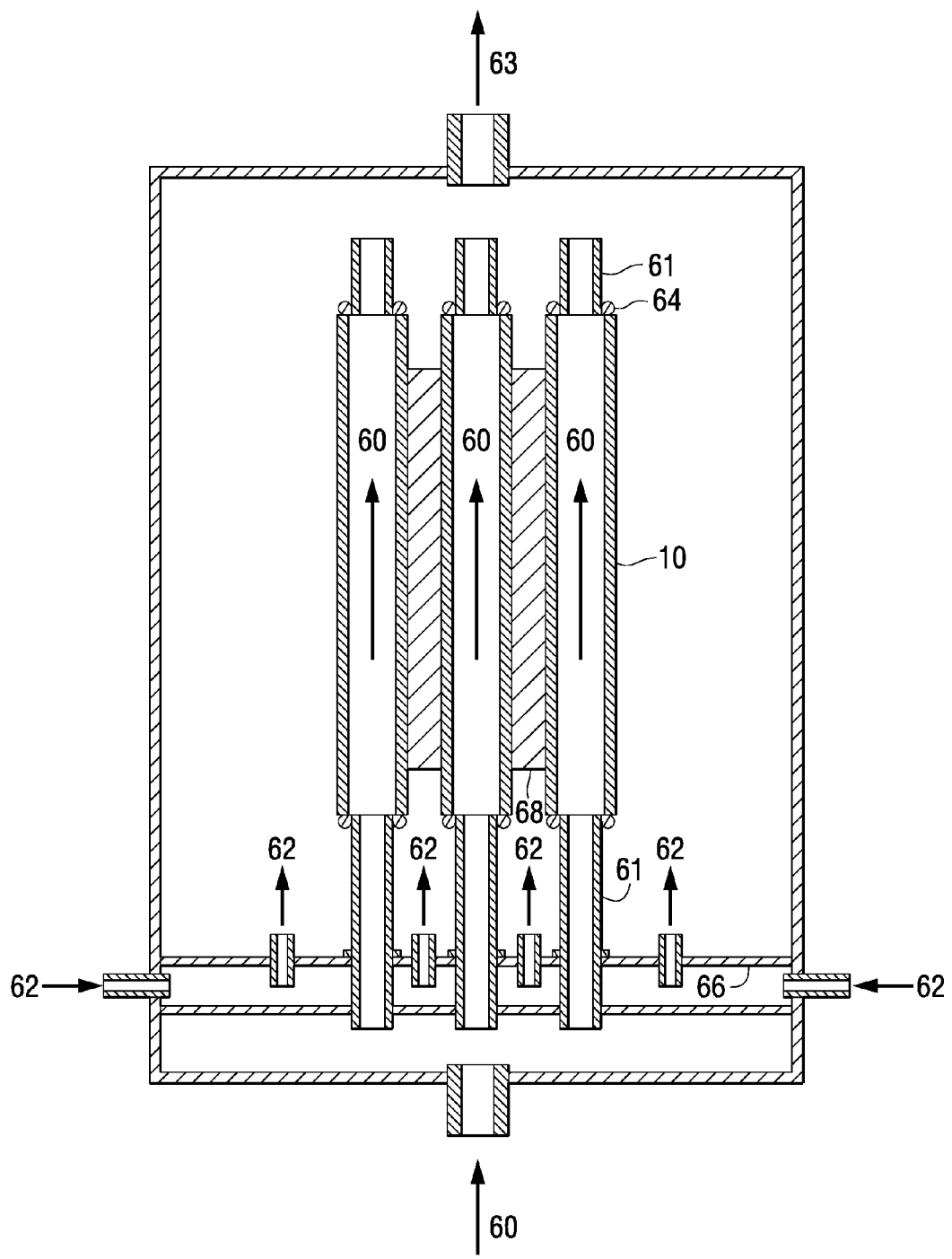
FIG. 4A is a schematic illustration of 'once-through', tubular, co-flow SOFC stack module comprised of an array of cylindrical tubular SOFCs connected in series and/or in parallel.
Figure 4B:
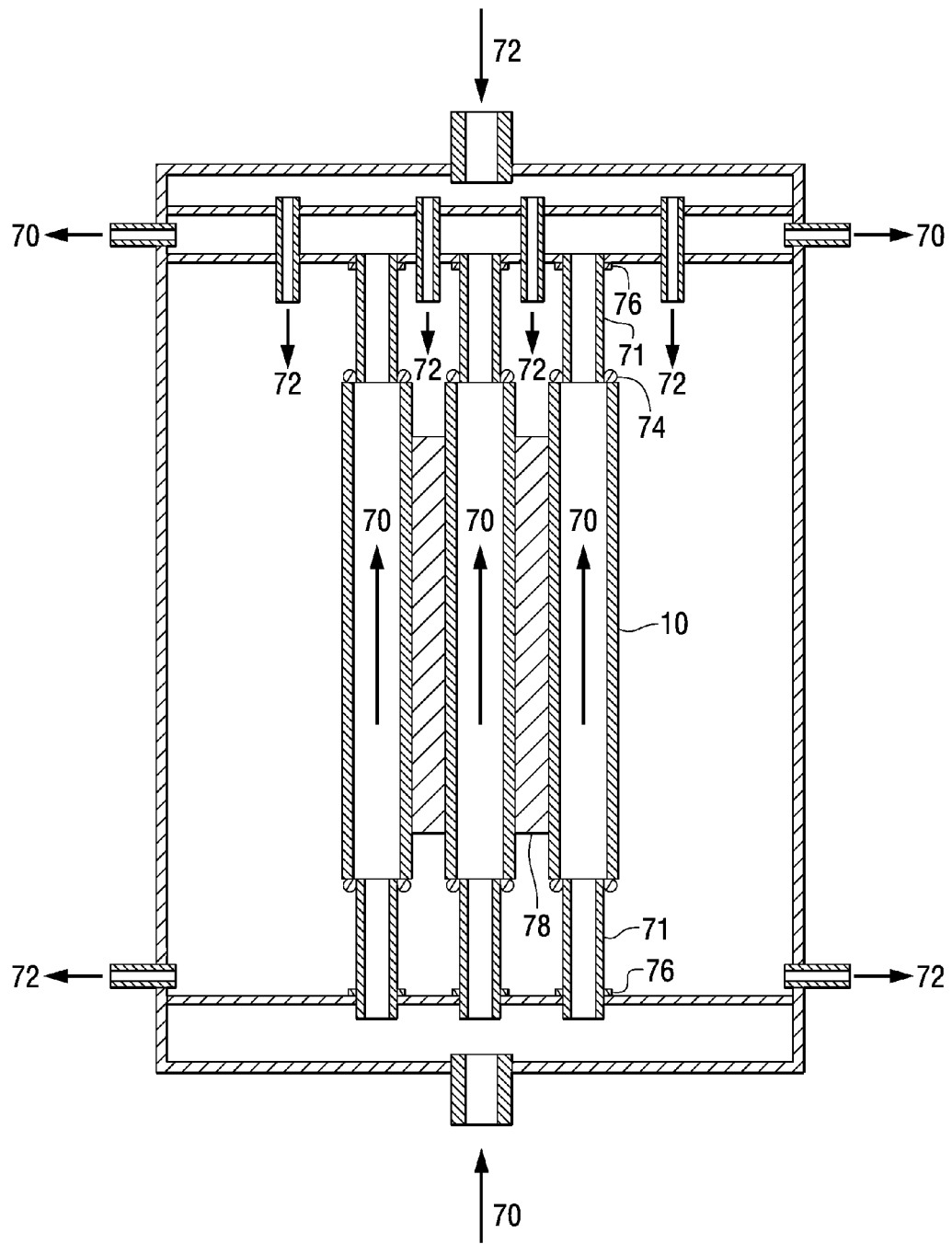
FIG. 4B is a schematic illustration of a 'once-through' tubular counter-flow SOFC module generally similar to FIG. 4A.
Figure 4C:
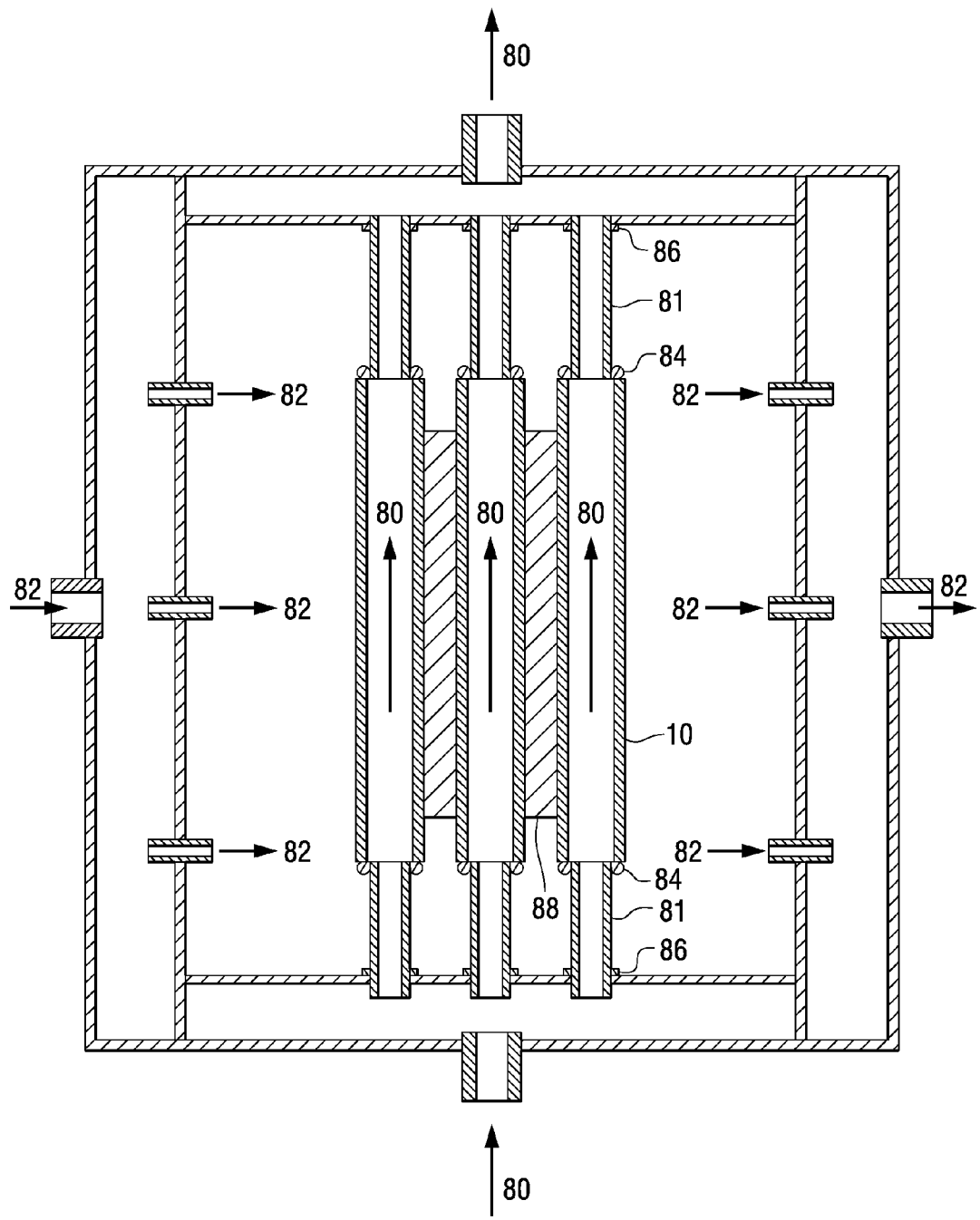
FIG. 4C is a schematic illustration of a 'once-through' tubular cross-flow module generally similar to FIG. 4A.

The foregoing elements can also form an open ended electrochemical cell, as shown in FIGS. 4A-4C. The ceramic interconnection serves as an electrical interconnection to an electrode of a second electrochemical cell. The electrical connection is made along the axial length of the interconnection through a metal fiber felt or a metal foam cell connector 68, 78, 88 as shown in FIGS. 4A, 4B and 4C, respectively.

A plurality of the foregoing individual tubular electrochemical cells 10 can form a fuel cell bundle. The bundle is shown as the three tubular cells 10 in FIGS. 4A, 4B, and 4C, each cell being of the double open end configuration. Each electrochemical cell 10 is connected in series or in parallel between which a metal fiber felt or a metal foam 68, 78, 88 shown in FIGS. 4A, 4B and 4C, respectively, is sintered-bonded. Referring again to FIGS. 4A, 4B and 4C, the tubular electrochemical cell 10 is extended with a segment of non-porous tube (61, 71 and 81) that has the same chemical composition as the porous metal support tube substrate 30 described previously, and the same diameter. The non-porous tubular segments are electrically welded with metallic welds (64, 74, 84) to both ends of the porous metal substrate. In these figures, the preferred module configurations include three gas flowing patterns between air and fuel; co-flow, counter-flow and cross-flow.

In FIG. 4A, air flow 60 and fuel flow 62 are first introduced into two sealed compartments and then fed into the stack in the same flow direction. Axially traveling over the surface of each cell, the fuel is electrochemically oxidized while the electricity is being produced. The depleted fuel then meets with vitiated air at another end of the bundle and combusts into the exhaust stream 63. In such a configuration, only one set of low-temperature mechanical seals 66 are required at the entrance of air and fuel.

In FIG. 4B, air flow 70 and fuel flow 72 are first introduced into two sealed compartments located at the top and the bottom of the module, respectively. The air and fuel flows travel in an opposite direction over the inner and outer surfaces of the tubular electrochemical cell 10 during the electrochemical oxidation reaction of the fuel. The depleted fuel and vitiated air exit the module in two separate paths, which makes capture of carbon in the downstream possible. In such a configuration, two sets of low-temperature mechanical seals 76 are required.

In FIG. 4C, the air flow 80 and fuel flow 82 are perpendicular as they travel over the inner and outer surfaces of the tubular electrochemical cell 10 during the electrochemical oxidation reaction of the fuel. The depleted fuel and vitiated air exit the module in two separate paths, which makes capture of carbon in the downstream possible. In such a configuration, two sets of low-temperature mechanical seals 86 are required.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An intermediate temperature, axially extending solid oxide fuel cell structure capable of operating at 600° C. to 800° C. comprising:
   (1) a porous hollow elongated metal support tube having a thickness of from 0.10 mm to 1.0 mm, having a porosity of from 25 vol. % to 50 vol. %, having an electronic conductivity of from 3,000 S/cm to 6,000 S/cm, and a tensile strength from 700 GPa to 900 GPa, which metal support is selected from the group consisting of sintered oxidation resistant mixtures of iron, chromium and manganese with optional amounts of materials selected from the group consisting of titanium, yttrium, lanthanum, cerium and zirconium, and mixtures thereof, to provide a pool of electrons required for oxidant reduction reactions at a contacting air electrode;

(2) a ceramic air electrode, having a porosity of from 20 vol. % to 30 vol. %, contacting the metal support tube and capable of reducing oxygen molecules into oxygen ions at 600° C. to 800° C., and having a thickness of 0.010 mm to 0.2 mm;

(3) a gas tight solid oxide electrolyte contacting the air electrode, the electrolyte capable of conducting oxygen ions at 600° C. to 800° C., and having a thickness of 0.001 mm to 0.01 mm;

(4) an outer cermet fuel electrode contacting the electrolyte;

(5) a ceramic interconnection material having a thickness of from 0.01 mm to 0.1 mm, contacting a segment of the metal support tube; and (6) an electrically conductive cell structure to cell structure contact layer having a thickness of from 0.001 mm to 0.010 mm; wherein the solid oxide fuel cell structure has two open ends.

2. The solid oxide fuel cell structure of claim 1, wherein the gas tight electrolyte partially surrounds the air electrode to provide an axially extending radial segment, where an electrically conductive interconnection material is disposed in said radial segment and is electrically coupled to the porous metal support tube, wherein the metal support tube has a thickness of from 0.10 mm to 0.35 mm and the air electrode has a thickness from 0.010 mm to 0.050 mm and wherein the minimalist metal support has a tensile strength 100 times stronger than ceramic supports.

3. The solid oxide fuel cell structure of claim 1, wherein the electrodes and electrolyte define an active cell and the ceramic interconnection material extends along the length of the fuel cell structure.

4. The solid oxide fuel cell structure of claim 1, wherein the metal support thickness is from 0.10 mm to 0.35 mm, and the air electrode thickness is from 0.010 mm to 0.050 mm.

5. The solid oxide fuel cell structure of claim 1, wherein the ceramic interconnection prevents oxygen molecules from leaking through the metal support tube but avoids thermal growth of oxide scale.

6. A solid oxide module configuration comprising a plurality of solid oxide fuel cell structures of claim 1, wherein the module configuration utilizes air and fuel flow in one of three patterns selected from the group consisting of co-flow, counter-flow and cross-flow.

* * * * *